Oct. 28, 1958  L. P. RIVETTE  2,858,139
WHEELED BABY CARRIER WITH ROTATABLY MOUNTED CRADLE
Filed May 4, 1955  2 Sheets-Sheet 1

INVENTOR
LOUIS P. RIVETTE

BY

ATTORNEY

Oct. 28, 1958   L. P. RIVETTE   2,858,139
WHEELED BABY CARRIER WITH ROTATABLY MOUNTED CRADLE
Filed May 4, 1955   2 Sheets-Sheet 2

INVENTOR
LOUIS P. RIVETTE

BY Ivan P. Tashof.

ATTORNEY

United States Patent Office 2,858,139
Patented Oct. 28, 1958

2,858,139

WHEELED BABY CARRIER WITH ROTATABLY MOUNTED CRADLE

Louis P. Rivette, New Orleans, La.

Application May 4, 1955, Serial No. 505,965

3 Claims. (Cl. 280—31)

The present invention relates to a carriage transported baby carrier constructed to permit a cradle to be positioned in a convenient location with respect to the mother's bed.

In accordance with the invention, a wheeled carriage is provided within which a cradle is supported for horizontal movement in a direction transverse to the carriage into a horizontally extended position in which it can be rotated into a position transverse to the longitudinal axis of the carriage. Preferably the carriage is supported upon a vertically extensible mounting so that the elevation of the carriage, and hence the cradle therewithin, may be controlled.

The primary object of the invention is the provision of a wheeled baby carriage within which a cradle is supported in such manner that the height, rotational position and transverse position of the cradle may be controlled. Thus, the cradle may be moved transversely from its position within the carriage, rotated to a position at right angles to the carriage and positioned with respect to height so that the cradle may be positioned above a bed in a convenient attitude although the supporting carriage is positioned at the side of the bed.

Other and further objects of the invention will be apparent from the description of the invention which follows.

Referring to the accompanying drawings.

Figure 1:
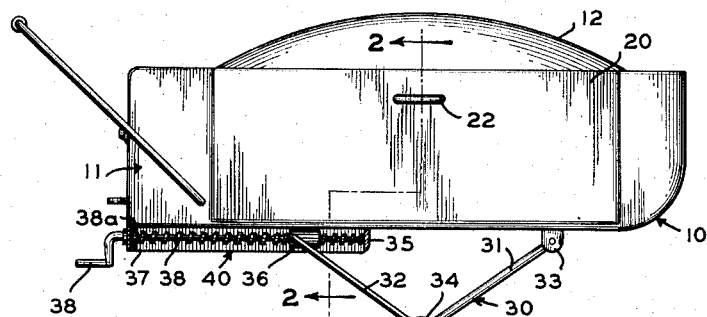
Fig. 1 is a side elevation of a baby carriage, constructed in accordance with the invention, the structure beneath the body of the carriage being shown in section.

Referring to the drawings, and with particular reference to Fig. 1, it will be seen that the baby carriage in accordance with the invention comprises a main body 10, a side wall of which is partially constituted by a side panel 20. The body 10 is mounted upon a wheeled support indicated generally by the numeral 30, there being means indicated generally by the numeral 40 whereby the height of the body 10 of the carriage may be adjusted with respect to the ground. If desired, a cover member 12 may be positioned to overlie the top of the carriage to protect the baby from drafts and to diffuse and soften the surrounding light. This cover may be louvered for summer use. A compartment 11 may be provided, as shown, for storage of those accessories which are desired in the care of an infant.

Figure 2:
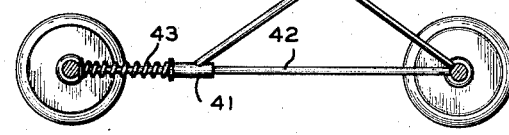
Fig. 2 is a sectional view taken on the line 2—2 of Fig. 1 showing the side panel in the open position and illustrating the manner in which the cradle is mounted within the carriage.

Referring to Fig. 2, a cradle 50 is mounted within the body 10 of the carriage with the longitudinal axis of the cradle parallel to the longitudinal axis of the body 10. It will be apparent that if the side panel 20 in Fig. 2 were pivoted into a vertical position, the cradle 50 would be entirely confined within the carriage body 10.

As can be seen in Fig. 2, the side panel 20 is pivotally mounted at its lower portion to the body 10 so that the side panel 20 can be positioned either vertically, in which case it constitutes a portion of the body 10, or horizontally, in which case the side panel 20 constitutes a horizontal extension of the bottom of the body 10.

The cradle 50 is secured to a turntable 60, the turntable being rotatably supported upon a stationary plate 61 which is in turn supported by tracks 70 which are secured in any suitable manner to the bottom of the body 10. As can be seen, the turntable 60 is secured to the undersurface of the cradle 50 by means of a plurality of brackets 62. The turntable 60 is provided with a centrally disposed aperture 63 through which a bolt 64 extends. The turntable 60 rests upon a separator plate 65 which in turn rests upon the stationary plate 61.

The separator plate 65 and the stationary plate 61 are also provided with a centrally disposed aperture and the bolt 64 extends through these several apertures so that the turntable 60 may be rotated with respect to the stationary plate 61 using the bolt 64 as an axis of rotation. The turntable 60, the separator plate 65 and the stationary plate 61 are maintained in position by means of a nut 66 and a lock nut 67, a compression spring 68 being interposed between the nut 66 and the bottom of the stationary plate 61 so that turntable 60, separator plate 65 and stationary plate 61 are resiliently urged together.

Figure 3:
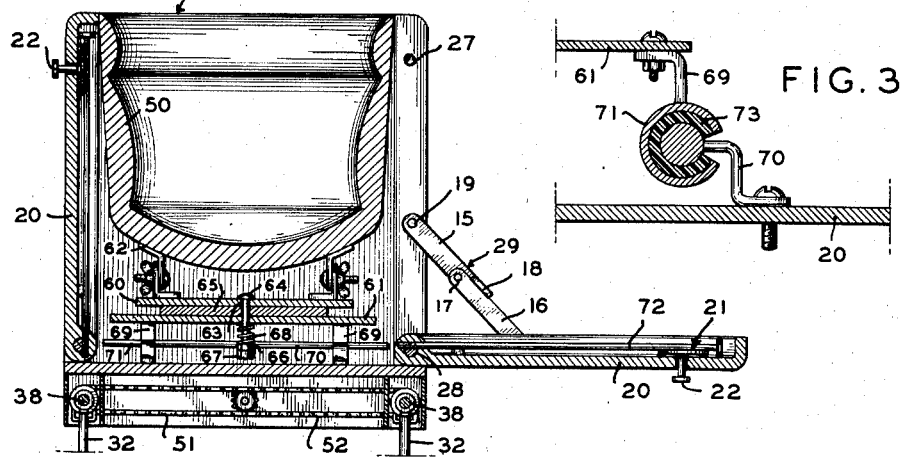
Fig. 3 is a sectional view, on an enlarged scale, showing the manner in which the cradle is mounted to enable it to be extended transversely from within the baby carriage.

Stationary plate 61 is provided at its forward and rearward edges with depending brackets 69 (Fig. 3) to the lower ends of which is secured a slide member, a section of pipe 71 which is slit along its length being illustrated. The pipe section 71 is secured to the bracket 69 as for example by welding.

The bottom of the body 10 and the side panel 20 support track members 70 and 72 respectively, the track members 70 and 72 being in longitudinal alignment when the side panel 20 is pivoted into horizontal position as shown in Fig. 2. The track members 70 and 72 are provided with bushings 73 (Fig. 3), the pipe sections 71 being fitted to surround the bushings 73 for sliding movement therealong.

Figure 4:
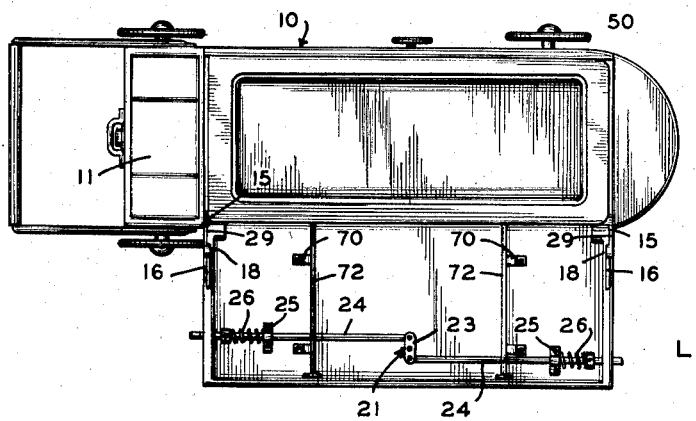
Fig. 4 is a plan view of the baby carrier showing the side panel in the open position and the cradle positioned within the carriage body.

Referring to Figs. 2 and 4 of the drawings, side panel 20 carries a handle 21, this handle comprising a knob 22, a cross bar 23, axially shiftable fastening rods 24 which slide within guides 25 mounted on the side panel 20. Compression springs 26 are positioned on the rods 24 between the guides 25 and stop members secured to the rods 24 so that the rods are continuously urged outwardly, e. g. into locking position.

The body 10 of the carriage is provided with sleeves 27 (Fig. 2) and the rods 24 project into the sleeves 27 to secure the side panel 20 in its vertical position. As will be evident, rotation of the knob 22 will serve to tilt the cross bar 23 and retract the rods 24 overcoming the locking action of the compression springs 26 to permit the side panel 20 to be released from the body 10 and pivoted about pivot point 28 into the horizontal position shown in Fig. 2 of the drawings.

As can be seen in Fig. 2, a hinged support 29 is provided for side panel 20, the support 29 comprising members 15 and 16 which are pivotally connected together at point 17. The member 15 is provided with a stop portion 18 bent out of the plane thereof. The members 15 and 16 are pivotally connected to the side panel 20 and the body 10 by means of pivots 19 and 19' respectively.

Referring to Fig. 1 of the drawings, the carriage is supported upon wheeled support 30. In the embodiment shown, wheeled support 30 comprises pairs of cross members 31 and 32. The upper ends of cross members 31 are pivotally secured to the undersurface of the body 10 at 33 and the lower ends are pivotally secured to slide members 41 which are slidably mounted on wheel spacing members 42. Compression springs 43 bear against slide members 41 urging the carriage body 10 into elevated position. Cross members 31 and 32 are pivotally interconnected at their mid portions 34. The upper ends of cross members 32 are pivotally secured to internally threaded tubular members 36. A second tubular member 37 is mounted at the end of the body 10 and threaded bar 38 carrying the stop 38a passes through tubular members 36 and 37, the threads of the bar engaging the threads of the tubular member 36, the bar 38 being supported at its inner end 35. A crank 39 is provided and rotation of crank 39 is transmitted to the bars 38 by chains 51 and 52 so that the distance between the upper end of the cross bars 32 and the end of the body 10 can be adjusted by revolution of crank 39. Crank 39 is preferably hingedly connected to enable it to be folded out of the way.

Figure 6:
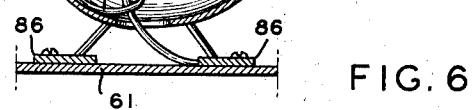
Fig. 6 is a sectional elevation showing the details of the thumb latch.
Figure 5:
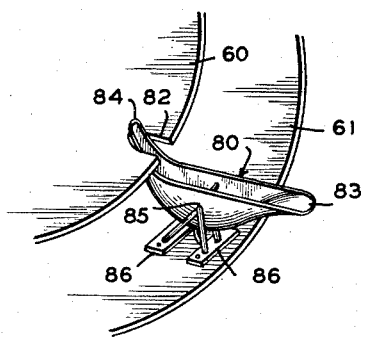
Fig. 5 is a perspective view of a portion of the turntable and stationary plate and showing the use of a thumb latch mounted on the stationary plate for fixing the angular position of the turntable.

It is desirable, in accordance with the invention, to be able to fix the cradle 50 in any desired angular position. For this purpose, the turntable 60 is provided with notches 82 as shown in Fig. 5, and a latch mechanism which is preferably thumb operated is secured to the stationary plate 61 so that the turntable 60 may be stopped at any desired point. More preferably, the latch mechanism is spring-urged toward the turntable 60 so that the latch will automatically engage the notches 82 on the turntable when the desired angular position of the cradle is reached. The latch mechanism shown in Figs. 5 and 6 is a thumb latch 80 which is constituted by a cup-shaped member 83 having a notch-engaging extension 84. A rod 85 is mounted on supports 86 which are secured to the stationary plate 61 and the cup-shaped member 83 pivots about the rod 85.

A hair spring 81 encircles the rod 85 and bears against the forward portion of the cup-shaped member 83 to bias the notch-engaging extension 84 toward the notches 82. As will be obvious, the spring pressure provided by the hair spring 81 can be overcome by the application of downward pressure to the rear of the cup-shaped member 83.

The operation of the baby carrier of the invention will now be apparent and is as follows: The baby carrier is wheeled alongside the bed of the mother and crank 39 is operated to elevate the body 10 of the carriage to the desired elevation. Knob 22 is pivoted to retract rods 24 from sleeves 27 against the locking action of springs 26 to release the side panel 20 from the body 10 of the carriage. The side panel 20 may then be pivoted about pivot point 28 into the horizontal position shown in Fig. 2. This leaves the cradle 50 lying within the body of the carriage as is shown in Figs. 2 and 4. The side panel 20 is supported in its horizontal position by means of the hinged support means 29.

Figure 7:
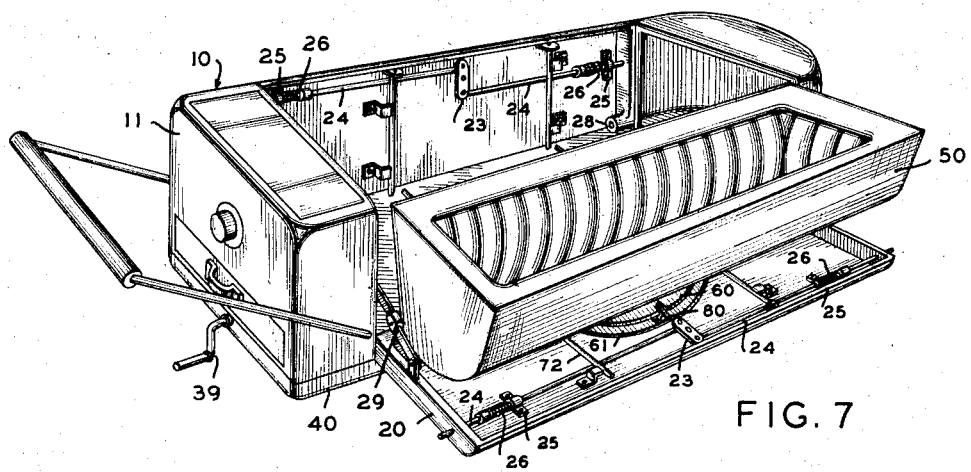
Fig. 7 is a perspective view of the carriage body showing the cradle extended transversely from within the carriage body into a position overlying the horizontally positioned side panel.
Figure 8:
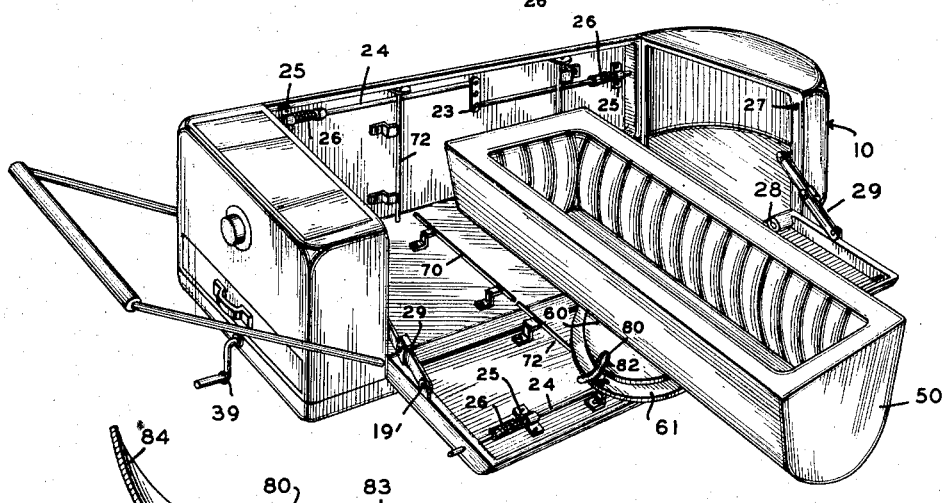
Fig. 8 is a perspective view similar to Fig. 7 showing the cradle rotated into a position transverse to the longitudinal axis of the carriage body.

The cradle 50 can then be slid from its position within the body of the carriage into a position overlying the side panel 20 as is shown in Fig. 7. This is accomplished by sliding the tubular slide members 71 along the rails 70 and 72, these rails being in longitudinal alignment when the side panel 20 is in horizontal position as shown in Fig. 2. Since the cradle 50 is supported upon the turntable 60, the latch mechanism shown in Figs. 5 and 6 is released to permit rotation of the turntable. The cradle 50 can then be rotated into a position transverse to the longitudinal axis of the body of the carriage as shown in Fig. 8.

Accordingly, the cradle 50 will overlie the mother's bed at any suitable elevation and the latch mechanism 80 will engage a notch 82 on the turntable 60 to fix the cradle in a position transverse to the bed so that the baby will be in a convenient position to be attended to by its mother.

It will be apparent that identical side panels 20 may be provided on each side of the carriage body 10 so that the horizontal extension and rotation of the cradle 50, which has been described above, can be performed on either side of the carriage.

I claim:

1. In a baby carrier, a main body, at least one side panel hingedly connected to said main body and mounted for movement into and out of a vertical and horizontal position, a handle connected to said side panel, a wheeled support for said main body, means for adjusting the height of the body relative to the ground, a cover member overlying the top of said body, said main body being provided with a storage compartment, a cradle mounted within the body of the carrier, a plurality of tracks secured to the lower portion of said body, a plate supported on said tracks, a turntable rotatably connected to said plate for supporting said cradle, brackets securing said cradle to said turntable, locking means for selectively retaining said side panel in a vertical position, a hinged support for said side panel, stop means for limiting pivotal movement of said side panel, a latch mechanism for maintaining the cradle immobile in its adjusted positions, and tracks secured to said panel and arranged in alignment with the tracks which are secured to the body.

2. In a baby carrier, a main body, at least one side panel hingedly connected to said main body and mounted for movement into and out of a vertical and horizontal position, a handle connected to said side panel, a wheeled support for said main body, means for adjusting the height of the body relative to the ground, a cover member overlying the top of said body, said main body being provided with a storage compartment, a cradle mounted within the body of the carrier, a plurality of tracks secured to the lower portion of said body, a plate supported on said tracks, a turntable rotatably connected to said plate for supporting said cradle, brackets securing said cradle to said turntable, locking means for selectively retaining said side panel in a vertical position, a hinged support for said side panel, stop means for limiting pivotal movement of said side panel, a latch mechanism for maintaining said cradle immobile in its adjusted positions, tracks secured to said panel and arranged in alignment with the tracks which are secured to said body, said wheeled support including pairs of cross members, the upper ends of said cross members being pivotally connected to the undersurface of said body, said cross members being pivotally interconnected at their mid-portions, and a manually operable crank operatively connected to said cross members.

3. In a baby carrier, a main body, at least one side panel hingedly connected to said main body and mounted for movement into and out of a vertical and horizontal position, a handle connected to said side panel, a wheeled support for said main body, means for adjusting the height of the body relative to the ground, a cover member overlying the top of said body, said main body being provided with a storage compartment, a cradle mounted within the body of the carrier, a plurality of tracks secured to the lower portion of said body, a plate supported on said tracks, a turntable rotatably connected to said plate for supporting said cradle, brackets securing said cradle to said turntable, locking means for selectively retaining said side panel in a vertical position, a hinged support for said side panel, stop means for limiting pivotal movement of said side panel, a latch mechanism for maintaining said cradle immobile in its adjusted positions, tracks secured to said panel and arranged in alignment with the tracks which are secured to the body, said wheeled support including pairs of cross members, the upper ends of said cross members being pivotally connected to the undersurface of said body, said cross members being pivotally interconnected at their mid-portions, and a manually operable crank operatively connected to said cross members, said latch mechanism being manually operable, and said cradle adapted to be positioned in a convenient location with respect to a mother's bed.

References Cited in the file of this patent

UNITED STATES PATENTS

| | | |
|---|---|---|
| 793,168 | Abrams | June 27, 1905 |
| 982,882 | Schimmel | Jan. 31, 1911 |
| 1,101,458 | Levoy | June 23, 1914 |
| 1,303,930 | Lucas | May 20, 1919 |
| 2,429,723 | Kelley | Oct. 28, 1947 |
| 2,486,466 | Davis | Nov. 1, 1949 |
| 2,537,539 | McLendon | Jan. 9, 1951 |

FOREIGN PATENTS

| | | |
|---|---|---|
| 923,564 | France | Feb. 24, 1947 |